United States Patent [19]
Milligan et al.

[11] 3,778,792
[45] Dec. 11, 1973

[54] BLANKING CIRCUIT FOR HIGH RESOLUTION DATA RECOVERY SYSTEMS

[75] Inventors: Gene Emmett Milligan; Henry Minglo Ho, both of Torrance; Noboru Kimura, Gardena, all of Calif.

[73] Assignee: Control Data Corporation, Minneapolis, Minn.

[22] Filed: Apr. 10, 1972

[21] Appl. No.: 242,509

[52] U.S. Cl. .......................................... 340/174.1 H
[51] Int. Cl. .............................................. G11b 5/02
[58] Field of Search ............... 340/174.1 H, 174.1 B

[56] References Cited

UNITED STATES PATENTS 3,699,554 10/1972 Jones .......................... 340/174.1 H
3,623,040 11/1971 Erikson et al................ 340/174.1 H

*Primary Examiner*—Vincent P. Canney
*Attorney*—Edward L. Schwarz et al.

[57] ABSTRACT

A circuit for blanking unwanted error-causing peaks in the waveform derived from the reading of high density magnetic recordings wherein the data waveform is filtered by a low pass filter and variable Q resonant filter to generate a rectangular wave blanking signal applied to a flip-flop together with the equalized signal, whereby false peaks in the equalized signal are prevented from triggering the flip-flop by the blanking signal.

11 Claims, 2 Drawing Figures

PATENTED DEC 11 1973 3,778,792

BLANKING CIRCUIT FOR HIGH RESOLUTION DATA RECOVERY SYSTEMS

SUMMARY OF THE INVENTION

The present invention relates to magnetic digital recording, and more particularly to means for removing unwanted peak components when reading out the flux reversals of non-return-to-zero digital magnetic recordings.

BACKGROUND OF THE INVENTION

In high density digital magnetic recording, such as high density disc memory systems, the number of flux reversals per inch on the inner tracks of a disc surface usually is very high. Peak shifting and pulse crowding are common phenomena. As a result, shoulders may be present between flux reversals separated by two data cells or more in the readout signal. These shoulders produced unwanted peaks which introduce spurious pulses, causing errors in the output data pulse train.

In high density magnetic digital recording it is preferred that digital codes of low redundancy be employed to obtain higher recording efficiency and wider timing margins. Such a low redundancy code is discussed in U.S. Pat. No. 3,641,525 for "Self-Clocking Five Bit Record-Playback System," issued Feb. 8, 1972, inventor Gene E. Milligan, having a common assignee with the present application. However, these low redundancy codes are asymmetrical, causing a base line shift, and contain more frequency components than conventional digital recording codes. For example, the code disclosed in the above-identified patent has a spectrum of three fundamental frequency components: the natural readout frequency $f$, $f/2$ and $f/3$. The amplitude ratio between $f$ and $f/3$ is lower than that between $f$ and $f/2$ in the ratio of approximately 0.3 to 0.5. The presence of the third frequency component, $f/3$, particularly accentuates shoulders in the waveform, particularly, when the outer tracks on a magnetic disc are read.

The amount of peak shifting is reduced and the DC base line is restored by a frequency and phase shift distortion equalizer of the type disclosed in copending application Ser. No. 347,947 entitled "Delay Line Equalizer," filed Apr. 4, 1973, inventor Gene E. Milligan et al., and having a common assignee. The spurious peaks caused by the shoulder effect are eliminated by the blanking circuit of the present invention. However, after the playback signals are processed by an equalizer, shoulders in the waveform of the read signal become more prominent between flux reversals separated by two or more data cells. These shoulders are summed, producing spurious peaks causing erroneous data pulses. By blanking out the spurious peaks, the erroneous data pulses may be eliminated. The unequalized signals, after proper processing, are employed to blank out the unwanted peaks caused by the shoulders of the equalized signals.

The unequalized signal is tapped off the delay line of the equalizer disclosed in the above-identified copending application, Ser. No. 347,947, at a point 160 nsec. ahead of the equalized output signal from the delay line. The shoulders and the associated high frequency components of the unequalized signals are partially filtered and smoothed by the limited bandwidth of the delay line. The unequalized signal is further filtered and smoothed by an RC low pass filter. The signal output is then peaked by a parallel resonant filtr of variable Q. A threshold voltage is also established for a DC comparator. The peaked signal has a waveform with nearly equal amplitudes for all the frequency components of the data frequency, and no longer exhibits any shoulders since their associated high frequency components have been removed. The peaked signal is then fed into a DC comparator developing a rectangular blanking signal.

The equalized output signal from the delay line equalizer is applied to a peak detector generating positive and negative pulses on positive and negative peaks, respectively. These pulses, together with the rectangular blanking signal, are applied to an edge-triggered flip flop, and then to a differentiator-rectifier to develop the desired data output pulses.

DETAILED DESCRIPTION OF THE INVENTION

Figures 1, 2:
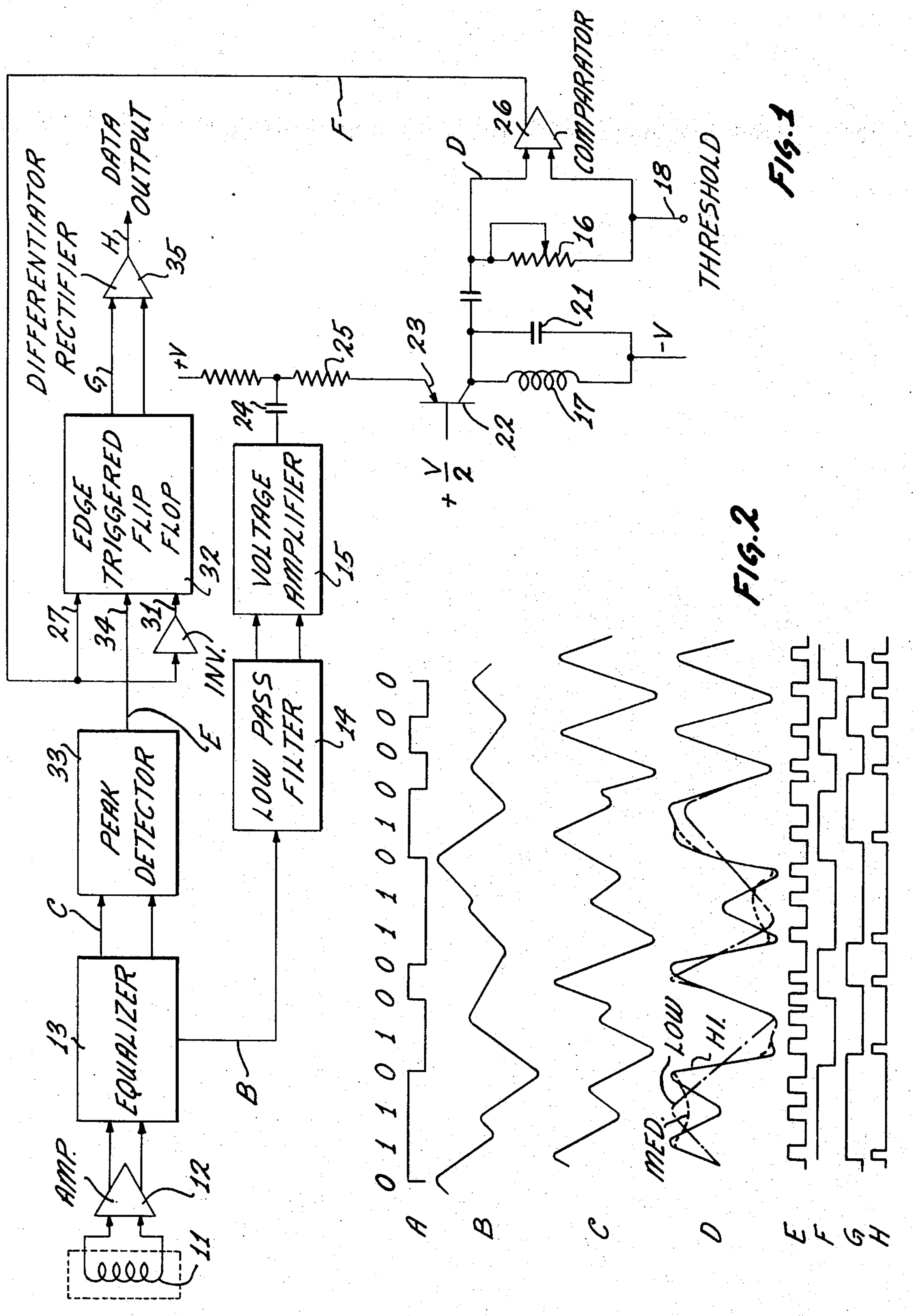
FIG. 1 is a schematic diagram of the blanking circuit of the present invention.
FIG. 2 illustrates waveforms occurring at various points in the circuit of FIG. 1.

The waveform recorded on the magnetic medium is illustrated at FIG. 2A. It is a non-return-to-zero recording resulting from the recording circuit forming part of the invention disclosed in the above-identified U.S. Pat. No. 3,641,525. A read head 11 translates the flux variations on the recording medium into an electrical signal consisting of pulses having a polarity dependent upon the direction of flux transitions. The pulse train is amplified by read amplifier 12. The amplified pulse train signal is then applied to equalizer 13 to reduce peak shifting. A partially equalized signal, illustrated at FIG. 2B, is obtained from a tap on the equalizer 13, 120 nsec. ahead of the output of the fully equalized signal, illustrated at FIG. 2C. The partially equalized waveform of FIG. 2B is applied to a low pass filter 14, conveniently a conventional RC filter across the input of voltage amplifier 15. The low pass filter 14 filters out some of the high frequency components which help form the spurious peaks illustrated in FIG. 2B. The output voltage from voltage amplifier 15 is applied to a variable Q parallel filter. The slope of one side of the resonance curve of the variable Q tuned circuit is employed to help square the waveform of FIG. 2B to the waveform marked "MED" in FIG. 2D. The effect on the waveform of medium, low and high Q's of the parallel resonant filter is illustrated in FIG. 2D.

From AC theory, it is well known that $e_i/R_3 = e_o/Z_l$, or $e_o = e_i/R_3 \times Z_l$, whrein $Z_l$ is the parallel impedance of the LC resonant circuit. The impedance $Z_l$ is a function of the damping resistor 16, the frequencies of interest, or the number of cycles off the resonant frequency of the LC circuit. The resonant frequency $f_o = 1/2\pi \sqrt{LC}$. The number of cycles off resonance, $\Delta f = f - f_o$. The circuit $Q = \omega_o CR$ $Q = 2\pi f_o CR$. A universal parameter, $a = Q (\Delta f/f_o)$ wherein $\Delta f/f_o$ is equal to the fractional detuning, or $a/Q$. Further, $e_o = (e_i/R_e)\ F(f,R) = (Q_i/R_e)\ F[Q(\Delta f/f_o)] = (e_i/R_e)\ F(a)$. By varying $R$ or $Q$, rate of roll-off of the resonant filter can be set at any desired amount. In contrast, conventional filters normally employ roll-offs that are fixed multiples of 6db per octave, the rate of roll-off being dependent upon the number of reactive elements used. There is no such limitation in the resonant filter employed in the present invention. It can be set to a rate of roll-off at any desired amount, varying the $Q$ by adjusting the potentiometer 16 across the resonant circuit including inductance 17 and capacitor 21. FIG. 2D illustrates the desired, as well as improper settings of a control potentiometer 16. A buffer amplifier, including transistor 22 having an emitter 23 connected in circuit with the output of voltage amplifier 15 through capacitor 24 and resistor 25, acts as a buffer to prevent loading of the input of the resonant circuit.

The signal modified by the resonant circuit, illustrated at FIG. 2D, is applied to a DC voltage comparator 26, together with a threshold voltage. Comparator 26 provides an output voltage only when the voltage applied to the input exceeds the threshold voltage applied to the terminal 18. The resultant output voltage from comparator 26 is a rectangular wave as illustrated at FIG. 2F. This signal is applied to input 27, and inverted, to input 31 of flip-flop 32.

The equalized output from equalizer 13, illustrated in FIG. 2C, is applied to a peak detector 33. The output of peak detector 33, illustrated at FIG. 2E, provides a positive pulse upon the occurrence of either a positive or a negative peak.

The positive pulses from peak detector 33 are applied to input 34 of edge-triggered flip-flop 32. As will be apparent from comparison of the input waveforms of FIGS. 2E and 2F, applied to inputs 34 and 27, respectively, and the waveform of FIG. 2F inverted, applied to input 31 with the output waveform of FIG. 2G, edge-triggered flip-flop 32 changes state when the waveform of FIG. 2E changes polarity, and the waveform of FIG. 2F, direct and inverted, also changes polarity. Flip-flop 32 changes state at the moment the later waveform front changes state. The output signal from edge-triggered flip-flop 32, illustrated at FIG. 2G, is then applied to a differentiator-rectifier 35. Differentiator-rectifier 35 provides a positive pulse upon the occurrence of each voltage transition of the input waveform of FIG. 2G. The differentiator-rectifier 35 provides an output pulse at the occurrence of each zero, while no pulse appears at binary 1's of the originally recorded data. FIG. 2H illustrates the output signal from differentiator-rectifier 35, reproducing the binary input data.

What is claimed is:

1. In a magnetic digital readout circuit, a peak blanking circuit comprising:
- readout signal equalizing means for correcting peak-shifting time distortion;
- a peak detector in circuit with said signal equalizing means generating a first pulse train in response to signal peaks;
- first filter means for reducing readout signal noise peaks;
- resonant filter means in circuit with said first filter means;
- voltage comparator means connected to said resonant filter means for providing a rectangular waveform;
- flip-flop means in circuit with said peak detector and said voltage comparator effective to provide a rectangular output waveform in response to delay-equalized signals from said peak detector and blanking signals from said comparator, whereby false peaks do not trigger said flip-flop means; and,
- pulse recovery means responsive to the rectangular wave from said flip-flop to provide binary pulses representing recorded binary data.

2. In the circuit defined in claim 1, said first filter means comprising a low pass filter.

3. In the circuit defined in claim 1, said resonant filter means comprising: an inductance and capacitance forming a parallel resonant circuit; a variable resistance in parallel with said parallel resonant circuit effective to vary the $Q$ thereof; and, buffer means in circuit between said first filter means and said parallel resonant circuit.

4. In the circuit defined in claim 3, said pulse recovery means including a differentiator and rectifier effective to convert the rectangular output wave from said flip-flop means into data pulses.

5. Playback circuit means for a digital magnetic recording comprising:
- a read head;
- time and phase distortion equalizing means;
- a peak detector in circuit with said equalizing means;
- blanking circuit means in circuit with said read head effective to generate a rectangular blanking voltage waveform of continuously variable duration;
- a flip-flop in circuit with said peak detector and said blanking circuit means whereby extraneous pulses from said peak detector are eliminated by said blanking voltage waveform.

6. Playback circuit means for a digital magnetic recording comprising: a read head;
- time and phase distortion equalizing means;
- a peak detector in circuit with said equalizing means;
- blanking circuit means in circuit with said read head comprising in combination low pass filter means, resonant filter means, and buffer means in circuit between said low pass filter means and said resonant filter means, said combination effective to generate a rectangular blanking voltage waveform;
- a flip-flop in circuit with said peak detector and said blanking circuit means whereby extraneous pulses from said peak detector are eliminated by said blanking voltage waveform.

7. In the circuit set forth in claim 6, a voltage comparator connected in circuit between said resonant filter means and said flip-flop.

8. In the circuit set forth in claim 7, said resonant filter means having a variable $Q$.

9. In the circuit set forth in claim 8, said resonant filter means including an inductance and a capacitor connected in a parallel resonant circuit, and a variable resistor connected across said parallel resonant circuit effective to vary the $Q$ thereof.

10. In the circuit set forth in claim 9, said flip-flop having an input responsive to the time and phase equalized signal from said peak detector having false peaks, and having inputs responsive to the blanking signal from said blanking circuit means to eliminate said false peaks, whereby an output rectangular wave having transitions at true data pulse positions is provided.

11. In the circuit set forth in claim 10, a differentiator-rectifier connected to the output of said flip-flop effective to convert said rectangular wave into binary digital pulses.

* * * * *